3,172,498
FOAMED PLASTIC DIAPHRAGM FOR SOUND TRANSDUCERS
Rudolf Görike, Vienna, Austria, assignor to Akustische u. Kino-Gerate Gesellschaft m.b.H., Vienna, Austria
Filed Oct. 4, 1962, Ser. No. 228,335
Claims priority, application Austria, Oct. 4, 1961,
A 7,464/61
3 Claims. (Cl. 181—32)

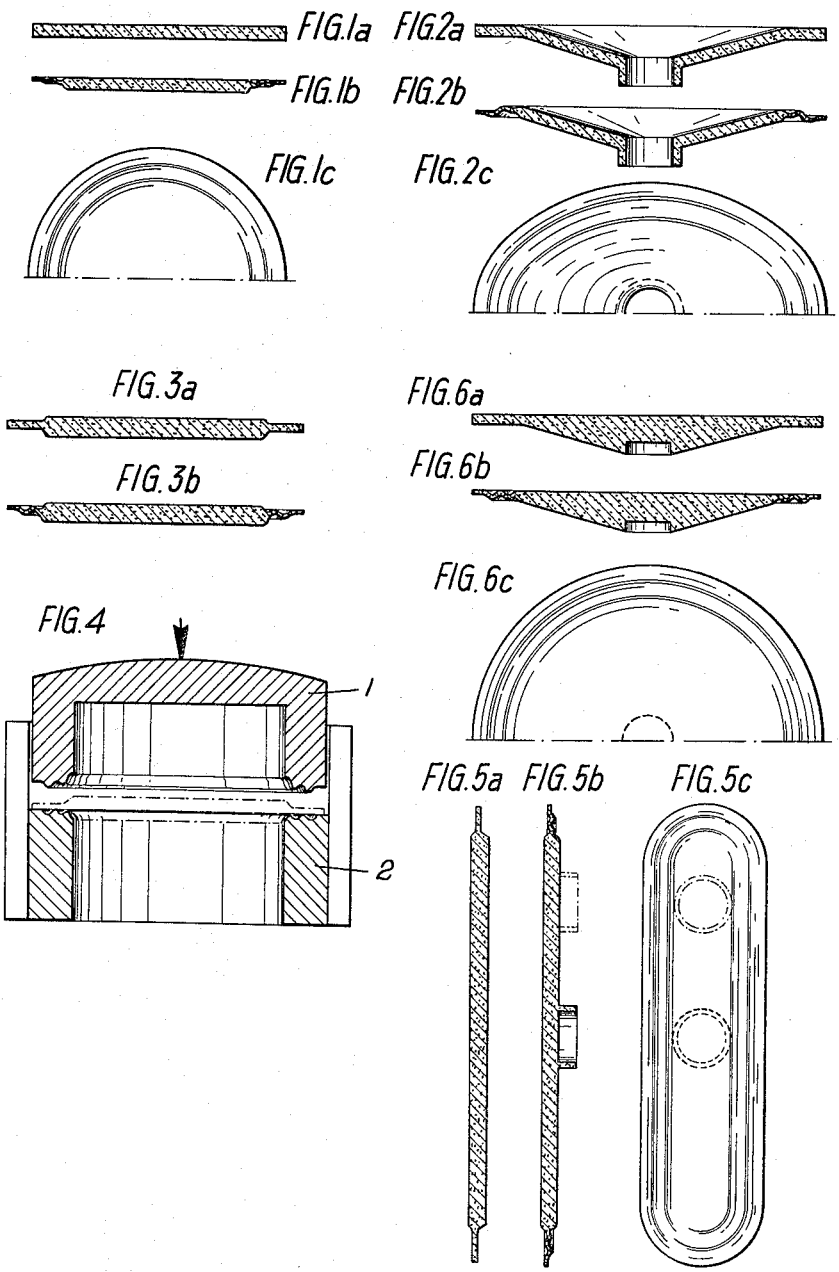

It is known to make diaphragms for sound transducers from foamed plastic; foamed varnishes as well as plastics containing an expanding agent are used for this purpose. For the mass manufacture of diaphragms, however, the diaphragm area proper is less significant than the elastic mounting at the external rim. It is known that the rim zone should be as flexible as possible, have an appropriate damping due to internal friction, and be unaffected by climatic influences.

The invention relates to a foamed plastic diaphragm for sound transducers, particularly for dynamic loudspeakers, which diaphragm can be economically mass-produced with great uniformity. The invention is characterized in that the diaphragm, made as an integral molding from plastics which contain an expanding agent, has a rim zone and, if desired, other portions, such as the seat for the moving coil, which are pressed in cold or hot condition to form a thin layer of planar, corrugated or different shape.

Experiments have shown that foamed thermoplastics can be pressed to form a thin layer having an internal friction, as is desired for transducer diaphragms.

The advantage afforded by the diaphragm according to the invention resides in that only two operations are required for the manufacture thereof. Because foamed plastics having a closed surface have a considerable resistance to moisture, an aftertreatment for protection against moisture, as is required with paper diaphragms, is not necessary. Nevertheless the surface may be provided with a cover layer. The foamed plastic diaphragm may be formed with a very flat cone or with a planar surface. The structure provides a carrying skeleton having a relatively larger amount of occluded air than where paper is used.

The advantages of the invention will be explained with reference to illustrative embodiments shown on the accompanying drawing. FIG. 1a is a sectional view showing a disc of foamed plastic. Pressing the rim results in the form shown in FIG. 1b in section, and shown in FIG. 1c in a plan view.

FIGS. 2a and 2b show a cone-shaped foamed plastic diaphragm. FIG. 2a shows the molding before it is pressed while FIG. 2b shows the shape obtained after embossing the rim. The respective plan view of FIG. 2b is shown in FIG. 2c. FIGS. 3a and 3b show a disc of foamed plastic, which disc has been foamed in such a shape that it is thinner at its periphery than the remaining portion of the disc. For instance, a disc having a diameter of 20 cm. may have a thickness of 1 cm. whereas the rim zone has a thickness of about 0.4 cm. By embossing, the thickness of the foamed plastic is reduced from 0.4 cm. to 0.05 cm. As a result, the restoring force of the rim zone is so small that the basic resonance of the diaphragm lies in the lower audio frequency range.

FIG. 4 shows the tool for embossing. The central portion of the moulding is exposed whereas the rim zone is pressed between dies 1 and 2. Rubber may be used instead of the die 1 consisting of hard material.

FIGS. 5a to 5c show an oval diaphragm. Whereas it is very difficult to make oval diaphragms, having a very large ratio between the axes, from paper, the use of foamed plastic enables the provision of very slender diaphragms. The drive may be transmitted from the moving coil to the diaphragm at a central point or an eccentric point.

As is shown in FIGS. 6a to 6c, the moulding may have a tapered cross-section. Ribs or other stiffening elements known from static engineering may be used.

What is claimed is:

1. In a diaphragm for sound transducers, wherein the diaphragm has a vibratory body portion, a fixed rim portion for mounting the diaphragm, and a voice coil seating portion, the improvement which comprises the vibratory body portion, the fixed rim portion and the voice coil seating portion being constituted by an integral molding of foamed plastic of uniform chemical composition throughout; said rim portion being directly adjacent said vibratory body portion and spaced from said voice coil seating portion, with said vibratory body portion integrally interconnecting said rim portion and said voice coil seating portion; said fixed rim portion and said voice coil seating portion being compressed to a lesser thickness and a greater density than said body portion, whereby the restoring forces of said fixed rim portion and of said voice coil seating portion are relatively so small that the fixed basic resonance of said diaphragm lies in the lower audio frequency range.

2. In a diaphragm for sound transducers, the improvement claimed in claim 1 in which said voice coil seating portion projects from said vibratory body portion.

3. In a diaphragm for sound transducers, the improvement claimed in claim 2, in which said voice coil seating portion comprises a tubular extension projecting from said vibratory body portion.

References Cited by the Examiner

UNITED STATES PATENTS

| | | | |
|---|---|---|---|
| 1,918,422 | 7/33 | Nystrom | 181—32 |
| 2,297,218 | 9/42 | Henrich et al. | 181—32 |
| 2,905,260 | 9/59 | Williams | 181—32 |
| 2,926,741 | 3/60 | Rohn et al. | 181—32 |

FOREIGN PATENTS 513,289   10/39   Great Britain.

LEO SMILOW, *Primary Examiner.*

C. W. ROBINSON, *Examiner.*